United States Patent [19]

Gall et al.

[11] 4,326,732

[45] Apr. 27, 1982

[54] FOLDABLE WHEELCHAIR

[75] Inventors: John C. Gall, Chicago; Richard D. Meharg, Wheaton, both of Ill.

[73] Assignee: Sears, Roebuck and Co., Chicago, Ill.

[21] Appl. No.: 185,116

[22] Filed: Sep. 8, 1980

[51] Int. Cl.³ .............................................. B62B 11/00

[52] U.S. Cl. .................................... 280/642; 280/650; 280/242 WC; 297/DIG. 4

[58] Field of Search ................. 280/639, 38, 641, 642, 280/647, 650, 242 WC; 297/DIG. 4

[56] References Cited

U.S. PATENT DOCUMENTS

| | | | |
|---|---|---|---|
| 865,541 | 9/1907 | Storm | 280/211 |
| 1,087,928 | 2/1914 | Diemer | 280/38 |
| 1,917,557 | 7/1933 | Steiger | 280/647 |
| 2,181,420 | 11/1939 | Everest et al. | 280/250 |
| 2,653,649 | 9/1953 | Linquist | 297/416 |
| 2,824,597 | 2/1958 | Lerman | 280/657 |
| 2,859,800 | 11/1958 | Jennings | 248/436 |
| 2,896,693 | 7/1959 | Schladebach | 280/42 X |
| 2,927,631 | 3/1960 | Andersson et al. | 297/335 |
| 3,021,889 | 2/1962 | Mize | 297/433 |
| 3,050,050 | 8/1962 | Kubicek | 128/33 |
| 3,111,331 | 11/1963 | Locke | 280/5.22 |
| 3,259,396 | 7/1966 | Zamotin | 280/5.22 |
| 3,389,934 | 6/1968 | Sully | 297/42 |
| 3,442,532 | 5/1969 | Gardner et al. | 280/250 |
| 3,666,292 | 5/1972 | Bartos | 280/234 |
| 3,882,949 | 5/1975 | Anderson | 180/8 A |
| 3,891,229 | 6/1975 | Gaffney | 280/644 |
| 3,901,527 | 8/1975 | Danziger et al. | 280/638 |
| 3,937,490 | 2/1976 | Nasr | 280/242 WC |
| 3,968,991 | 7/1976 | Maclaren | 297/45 |
| 3,990,745 | 11/1976 | Rodaway | 297/444 |
| 4,025,088 | 5/1977 | Rothschild | 280/644 |
| 4,042,250 | 8/1977 | Rodaway | 280/42 |
| 4,045,051 | 8/1977 | Igarashi et al. | 280/644 |
| 4,046,418 | 9/1977 | Smith et al. | 297/118 |
| 4,052,087 | 10/1977 | Gagliardi | 280/650 |
| 4,082,348 | 4/1978 | Haury | 297/45 |
| 4,098,521 | 7/1978 | Ferguson et al. | 280/242 WC |
| 4,119,342 | 10/1978 | Jones | 297/80 |

*Primary Examiner*—John A. Pekar

*Attorney, Agent, or Firm*—Arnstein, Gluck & Lehr

[57] ABSTRACT

A foldable wheelchair having shiftable driving wheels so arranged, that as the side frame members are folded to reduce the width of the chair, the wheels are controllably and automatically shifted to reduce the depth of the chair thereby effecting a reduction in the side area required to accommodate the chair.

13 Claims, 14 Drawing Figures

FOLDABLE WHEELCHAIR

BACKGROUND OF THE INVENTION

This invention relates to wheelchairs of the type used by invalids and more particularly to wheelchairs which may be folded or collapsed for storage or transportation.

The present public interest in saving fuel is manifested in a trend towards the manufacture of lighter weight more fuel efficient automotive vehicles. Such vehicles of necessity are dimensionally smaller than similar vehicles manufactured in recent prior years, such that trunk storage space and the space within the body of the vehicle are substantially reduced. In many of such smaller vehicles there is insufficient space in the trunk or in the body to accommodate a conventional foldable wheelchair for transportion.

The present state of the art includes a number of foldable chair constructions, each having rigid side frame structural members connected by an appropriate parallelogram linkage arrangement. These frame members may be moved together to reduce the width of the wheelchair but no reduction in the depths of the wheelchairs has been satisfactorily accomplished.

Typical prior art foldable wheelchairs of the above type are described in the following U.S. Pat Nos. 2,133,540; 2,354,949; 2,379,566; 2,665,743 and 2,675,057. A number of attempts have been made to provide both width and depth reduction in a foldable wheelchair. Examples of such constructions may be found in the following U.S. Pat. Nos. 2,896,693; 2,927,631; 3,901,527; 3,968,991; 4,025,088 and 4,045,051. Generally, in each of these constructions, over which the present invention is deemed to be an improvement, some sacrifice in function, economy and simplicity of construction or structural rigidity is experienced, primarily attributable to the elimination of inherently more rigid and lower cost side frame structural members which are characteristic of conventional foldable wheelchairs.

SUMMARY OF THE INVENTION

One of the objects of this invention is the provision of a foldable wheelchair which in extended or in use condition affords the comfort and convenience of conventional wheelchairs but which when in folded condition is compact and occupies a side area defined substantially by the diameter of the main driving wheels and the floor to arm rest height distance. Such area reduction in combination with state-of-the-art parallelogram type linkage width reduction provides a wheelchair which is accommodated and transportable within the reduced space available in the newer type smaller automotive vehicles.

Another object of this invention is the provision of a foldable wheelchair affording side area reduction while retaining the relatively low cost and maximum strength and rigidity of unit side frame construction.

Still another object of this invention is the provision in a foldable wheelchair of means for achieving side area reduction by controllably and automatically shifting the driving wheel axes relative to the side frame from their normal operating positions to place the chair in folded condition.

A further object of this invention is the provision of a foldable wheelchair in which the act of extending the chair from folded condition will controllably and automatically reposition the driving wheels to their normal operating positions wherein the wheels are secured for maximum efficiency in operation, balance and stability.

BRIEF DESCRIPTION OF THE PREFERRED EMBODIMENTS

Figure 1:
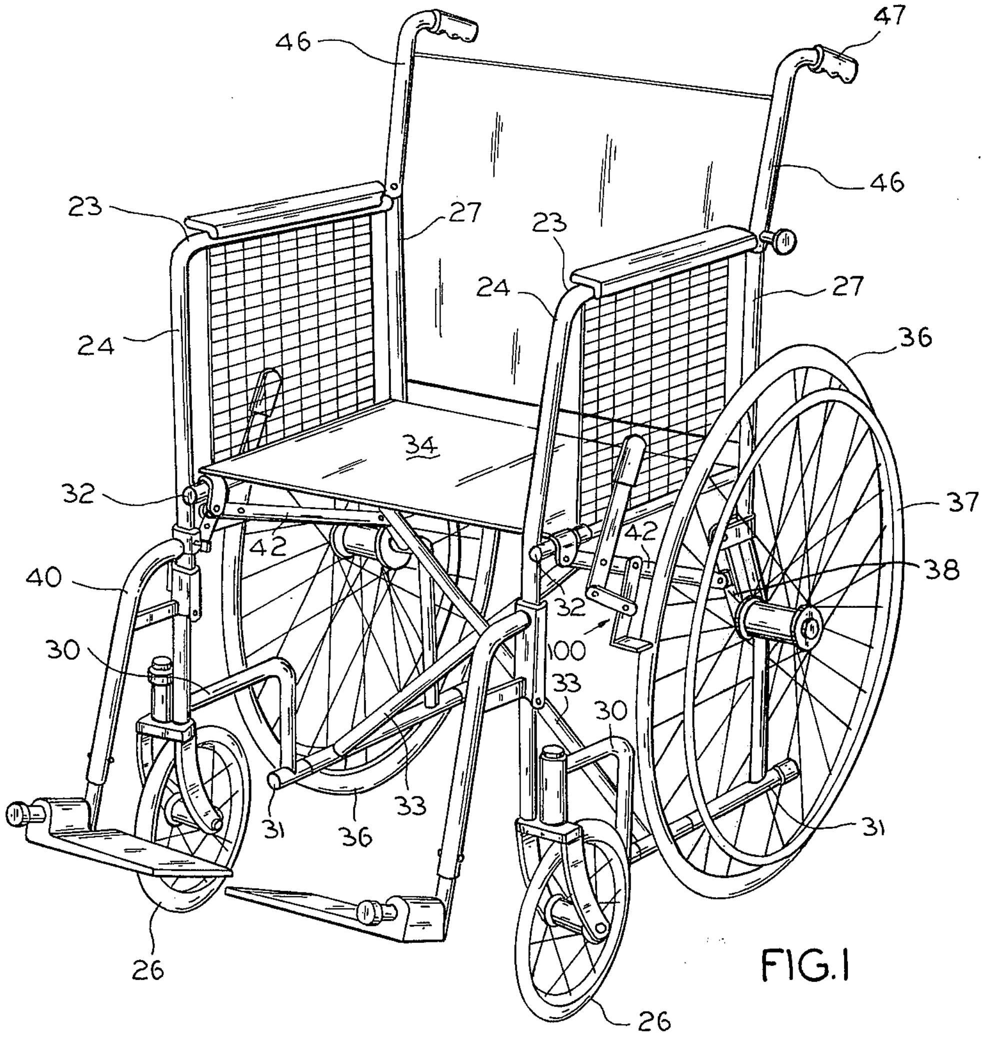
FIG. 1 is a front perspective view of a foldable wheelchair in accordance with an embodiment of the present invention.

Referring to the drawings, the foldable wheelchair in accordance with this invention, includes a pair of identical side frame members 20 and 21 of tubular construction, each having an arm rest 23 which at its forward end is bent downwardly substantially at right angles to form a front leg 24 on the lower end of which is mounted a swivel caster wheel 26. A rear leg 27 is welded at its upper end to the armrest 23 and includes an upper portion 27*a*, a lower portion 27*b* offset from the upper portion and an intermediate portion 27*c* connecting the upper and lower portions. A lug 28 is welded to the rear leg 27 substantially at the juncture of the leg portions 27*a* and 27*c* and extends in a forward direction. A retaining member 29, hereinafter to be more fully described, is welded to the rear leg substantially at the juncture of the inclined portion 27*c* and the lower portion 27*b*. The frame member 20,21 include a lower member 31 extending parallel to the armrest 23 and connected to the lower end of the rear leg portion 27*b*. An L-shaped bracket member 30 is secured to the forward end of the lower frame member 31 and to the front leg 24. Each frame member 20, 21 includes a seat support bar 32 which is disposed substantially parallel to the armrest 23 and is guided for vertical slidable movement on the front and rear legs 24 and 27, respectively. The opposite side frame members 20,21 of the chair are cross connected and braced by a pair of X-brace members 33 which are pivotally connected to each other intermediate their ends and are rotatably connected at their upper ends to the seat support bars 32 and at their lower ends are rotably connected to lower frame members 31. A fabric or flexible seat 34 is secured to the seat support bars 32. As will be hereinafter more fully explained, the seat support bars 32 are free to move vertically within the planes of the frame members 20,21 when the said members are moved toward each other during folding of the chair. Correspondingly, the seat 34 will fold together in a conventional manner.

Figure 3:
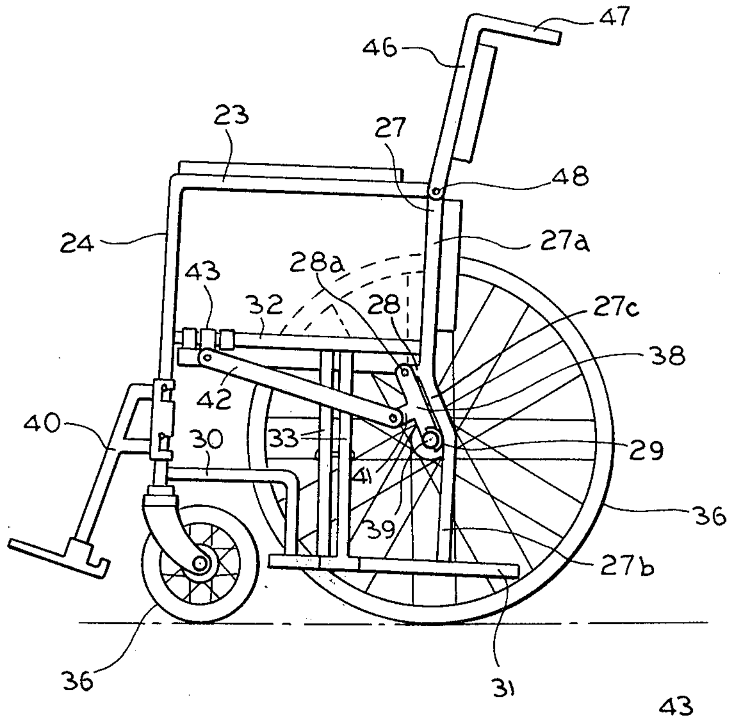
FIG. 3 is a side elevational view of the chair shown in FIG. 1 with one wheel removed for greater clarity.
Figure 5:
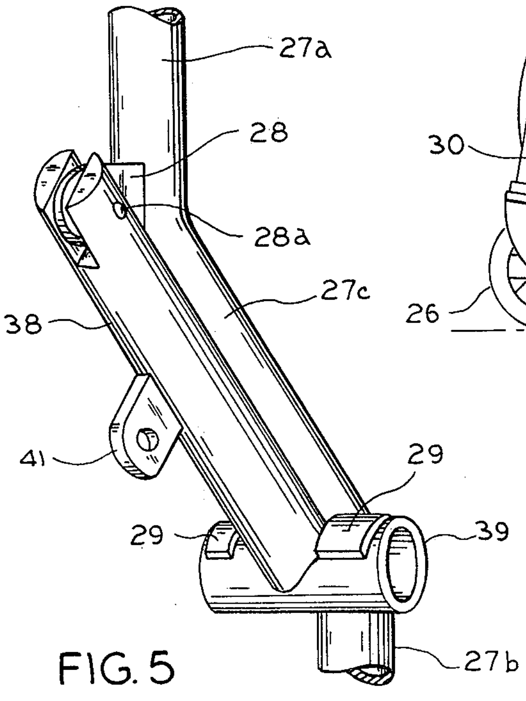
FIG. 5 is a perspective view, on an enlarged scale, of a structural detail.

The frame members 20,21 are adapted to carry a pair of large bicycle-type wheels 36 which are fitted with auxiliary hand rims 37 for use by the occupant in propelling the chair. In a conventional wheelchair, the hub of each wheel is permanently fixed to a respective rear vertical frame leg member corresponding to leg 27. The present invention, however, contemplates the provision of a wheel movable relative to a side frame member. Referring to FIGS. 3 and 5, a wheel support arm 38 provided with a bifurcated end is pivotally connected to the lug 28. The distal end of the arm 38 is provided with a tubular wheel mounting member 39 the axis of which extends laterally of the longitudinal axis of the arm 38 in T-formation. A lug 41 is welded to the arm 38 intermediate its ends and is pivotally connected to one end of a control link 42, the opposite end of the control link being pivotally connected to a bracket 43 rotatably mounted on the seat support bar 32. The axle assembly of the wheel is suitably supported in the mounting member 39. As seen in FIGS. 3 and 5, when the chair is in normal use the mounting member 39 is abutted against a pair of semi-circular lugs 29 welded to each rear leg 27. The lugs 29 snugly embrace the mounting member 39 and fit closely to the link arm 38 so as to inhibit side sway of the chair when carrying an occupant.

Referring to FIG. 3, a structural analysis will show that the weight of the chair, with or without an occupant, is carried by the front and rear legs 24 and 27 of the frame members 20,21 and is transmitted to the ground engaging wheels 36. The vertical force from the rear leg is applied at the pin **28*a* carried by the lug 28 and the vertical wheel reaction is applied at the wheel mounting member 39. So long as the force on the member 39 is to the rear of the pin 28*a* or to the left of the pin, as viewed in FIG. 3, a locking action will be effected. Because the control link 42 is disposed at a relatively small angle in relation to a horizontal plane passing through the bracket 43 the condition of the linkage arrangement approaches a toggle locking action such that any attempt to move the wheels 36 forwardly would encounter a high mechanical disadvantage requiring that the seat support bars 32 and the occupant be lifted vertically. Thus, in operating condition, as illustrated in FIG. 3, the wheel mounting members 39** are effectively locked against inadvertent displacement.

Figure 4:
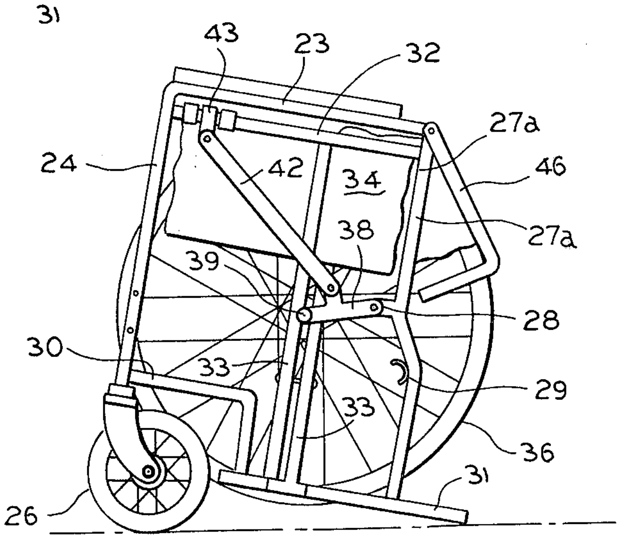
FIG. 4 is a view similar to FIG. 3 but showing the chair in folded condition.

FIG. 4 illustrates the relationship of the parts when the chair is in folded condition and the foot supports 40 have been removed. Such folding is effected by lifting the seat support bars 32 upwardly which action concurrently causes the X-brace members 33 to move towards each other reducing the distance between the side frame members 20,21. Such upward movement through the control links 42 automatically effects rocking, in a clockwise direction, of the wheel support arms 38 from the position illustrated in FIG. 3 to that illustrated in FIG. 4. Each wheel 36 and its mounting member 39 is moved in an arc forwardly and upwardly about pin **28*a* as a center so that in its final position it is now located substantially within the physical size limiation of the side frame members 20,21** thereby achieving a minimum horizontal size.

A back support frame 46 including handle members 47 is hinged as at 48 to rear leg members 27 and is provided with suitable locking means so that the back frame 46 may be locked in operative position, as illustrated in FIG. 3, and then rocked downwardly to the inoperative position illustrated in FIG. 4 so that it is disposed within the size limitations of the arm rests 23 thereby reducing the vertical size of the chair. It will be seen that the provision of the lugs 29 together with the joint at pin **28*a* will stabilize arm 38 and thereby eliminate side sway in the chair. Further, because the mounting member 39 is required to move downwardly in order to become disengaged from the lugs 29 the weight of the side frame members 20, 21 and associated parts, in addition to the weight of the occupant, will prevent inadvertent displacement of the mounting members 39 from the lugs 29**. Thus, when the chair is in unfolded or operative condition there is no likelihood of the chair collapsing or folding under the weight of the occupant.

Figure 6:
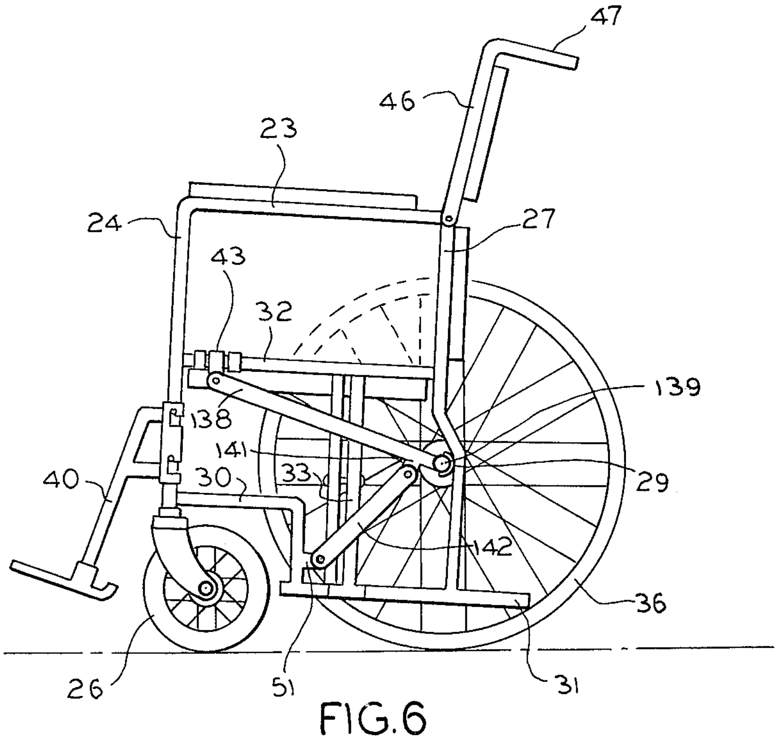
FIG. 6 is a side elevational view of a modified embodiment of the chair, with one wheel removed for greater clarity.
Figure 7:
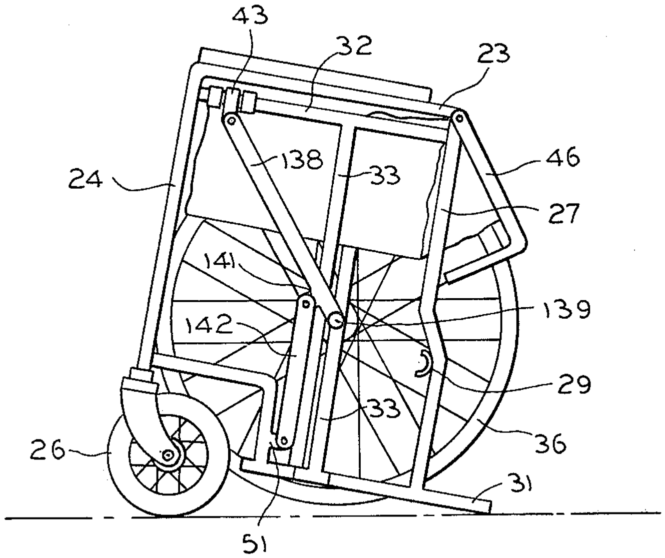
FIG. 7 is a view similar to FIG. 6 but showing the chair in folded condition.

In the modified embodiment illustrated in FIGS. 6 and 7 the wheel mounting member 139 for the wheel 36 is now suitably mounted on the end of a link bar 138, the distal end of which is pivotally secured to a bracket 43 rotatably mounted on the seat support bar 32. The link bar 138 includes a depending lug 141 to which is pivotally connected to one end of a control link 142 with the opposite end of said control link being pivotally connected to a lug 51 extending rearwardly of the bracket member 30. In all other respects the chair is similar to that hereinabove described and corresponding numerals are employed to identify corresponding parts.

In operative position, as shown in FIG. 6 the wheel mounting member 139 is disposed in abutment with the lugs 29 carried on the rear leg 27 and the wheels 36 are maintained in operative position and against displacement while the seat support bars 32 are in their lowered position and an occupant is seated on the flexible seat 34.

When the seat support bars 32 are moved upwardly manually to fold the chair, the wheel mounting members 139 are caused to be moved away from the lugs 29 and substantially towards the middle of the side frame members to the position shown in FIG. 7. Thus, the wheels 36 are disposed substantially within the boundry limits of the side frame members. Also, the back support frame 46 is pivoted downwardly, as shown.

Figure 8:
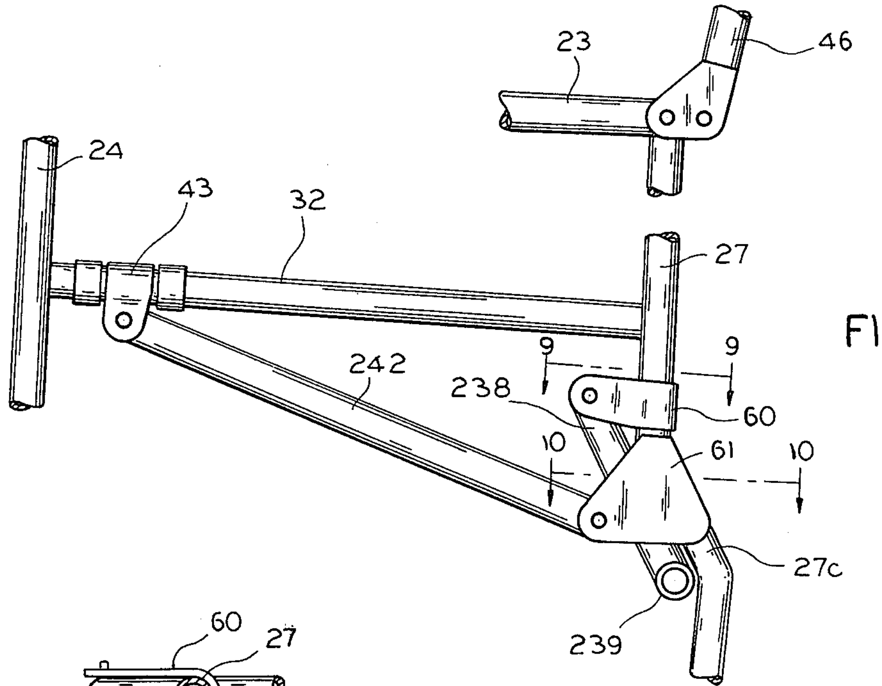
FIG. 8 is a side elevational view, on an enlarged scale, of structural details related to another modified embodiment.
Figure 9:
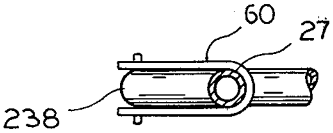
FIG. 9 is a cross-sectional view taken substantially on line 9—9 of FIG. 8.
Figure 10:
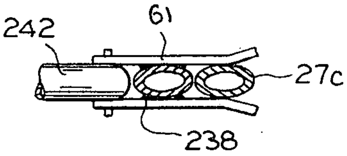
FIG. 10 is a cross-sectional view taken substantially on line 10—10 of FIG. 8.

FIG. 8 illustrates another modified embodiment in which an arm 238 is pivotally connected by a bracket 60 to rear leg 27 of the side frame member. A wheel mounting member 239 is fixed on the distal end of arm 238 and a pair of rigid plate members 61 are welded to arm 238 on opposite sides thereof and in spaced parallel relation. A control link 242 is pivotally and rotatable connected, at its upper end, to seat support bar 32 and, at its lower end, is pivotally connected to plate members 61.

In operative or in-use position the parts assume the relationship illustrated in FIG. 8 wherein the link 238 abuts the inclined leg portion **27*c* and the plate members 61 snugly engage opposite sides of said leg portion and assist in eliminating side sway with an occupant in the chair. Functionally, the structure of this embodiment is similar to that illustrated in FIGS. 3 and 4**.

Figure 11:
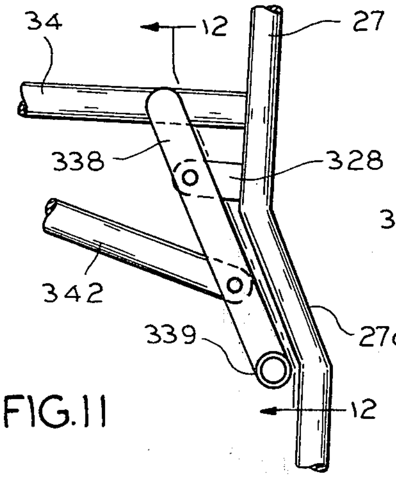
FIG. 11 is a side elevational view of structural details related to a further modified embodiment of the invention.
Figure 12:
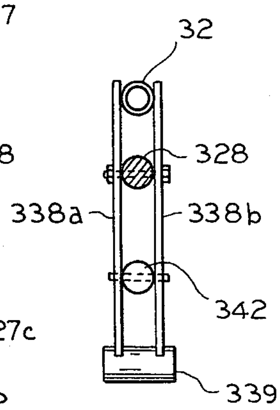
FIG. 12 is a cross-sectional view taken substantially on line 12—12 of FIG. 11.

FIGS. 11 and 12 illustrate a further modified embodiment which functions like that shown in FIGS. 3 and 4. However, arm 338 comprises a pair of spaced elongated bars 338*a* and 338*b* to the lower end of which is welded a wheel mounting member 339. The bars 338*a* and 338*b* are pivotally connected to control link 342 and also to bracket 328 rigid with rear leg 27. Control link 342 is connected to seat support bar 32 in the same manner as is shown in FIG. 8.

In operative or in-use position arm 338 abuts leg portion 27*c* and the extended upper ends of the bars 338*a, b,* embrace seat support bar 32 to prevent side sway. The function of the linkage arrangement of this embodiment is identical to that shown in FIGS. 3 and 4.

Figure 13:
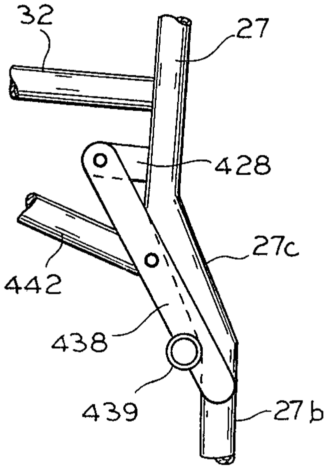
FIG. 13 is a fragmentary side elevational view of a further modified embodiment of the invention.

In another modified embodiment shown in FIG. 13, the linkage arrangement is quite similar to that shown in FIGS. 11 and 12. In this case arm 438 comprises a pair of spaced parallel bars pivotally connected to bracket 428 rigid with rear leg 27 and also pivotally connected to control link 442. A wheel mounting member 439 is welded to arm 438 at a point spaced from the end of the arm so as to provide lower extensions which are adapted to embrace opposite sides of the leg portions 27*b* and 27*c* when the chair is in operative position thereby to minimize side sway when the chair contains an occupant.

Figure 2:
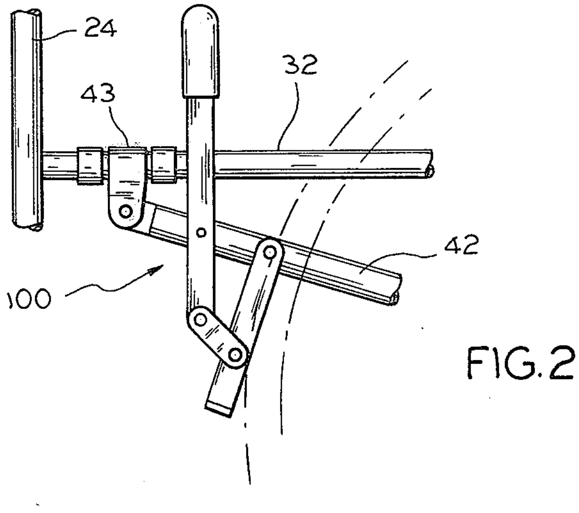
FIG. 2 is a side elevational view, on an enlarged scale, of a detail.

Each of the embodiments shown may include a hand brake 100 as shown in FIG. 2.

Figure 14:
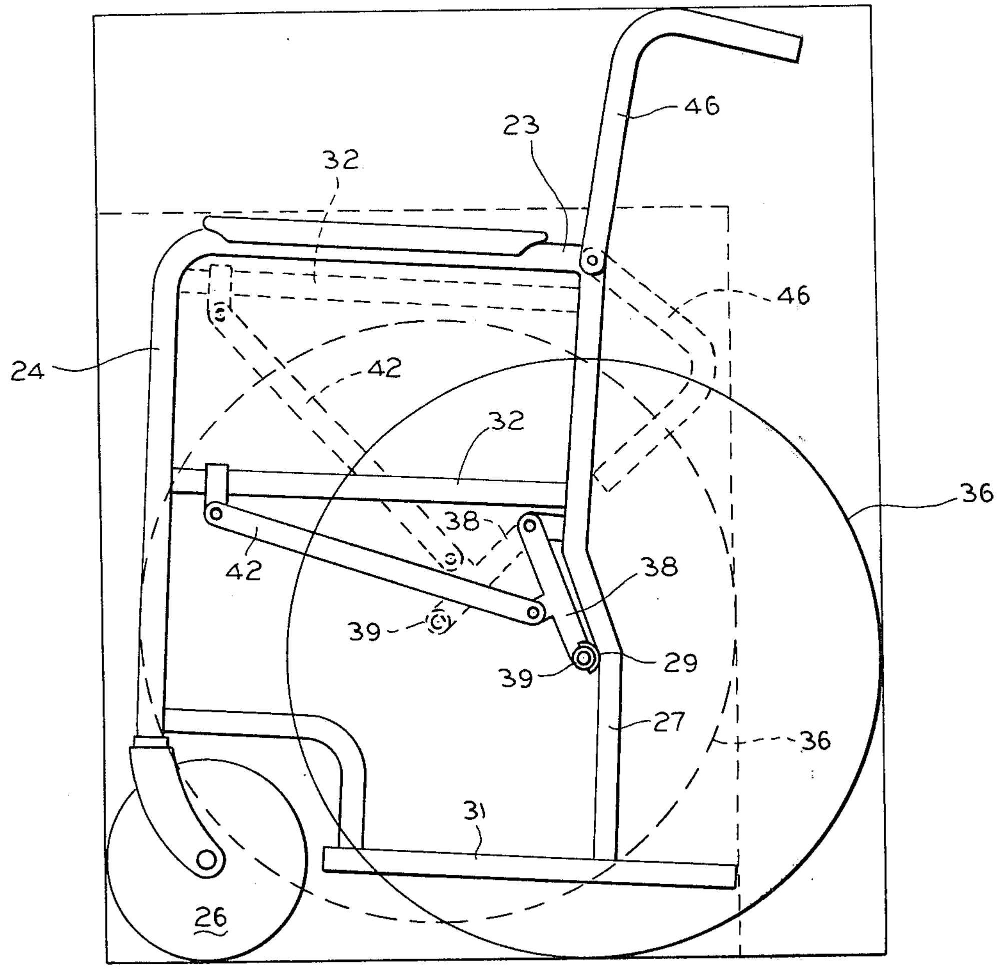
FIG. 14 is a diagrammatic view illustrating the relative side areas occupied by the chair when in normal use condition and when in folded condition.

FIG. 14, illustrate diagrammatically the comparative side dimensional areas required to accommodate the chair of the present invention when in fully operative condition and when in folded condition.

The fully extended and operative condition of the chair is shown in solid lines and the same is shown in a rectangle consisting also of solid lines. It is noted that the side dimensional area of the chair when in operative condition corresponds substantially to that of a conventional prior art foldable invalid chair in which the wheels are fixed to the rear legs and do not move.

The reduced side dimensional area occupied by the chair of the present invention and the assumed positions of certain of the movable components when in folded condition is shown in broken lines in FIG. 14. It should be apparent that a very substantial reduction in the space required to accommodate the folded chair of the present invention as against a folded conventional chair has been accomplished. Based on comparative measurements and calculations, the chair of the present invention, in folded condition, occupies approximately only 64% of the side area space required to accommodate a conventional folded chair.

Various changes coming with the spirit of this invention may suggest themselves to those skilled in the art; hence, we do not wish to be limited to the specific embodiments shown and described or uses mentioned, but intend the same to be merely exemplary, the scope of this invention being limited only by the appended claims.

I claim:

1. A foldable wheelchair comprising a pair of independent side frame members each including front and rear legs and horizontal upper and lower members connecting said front and rear legs, a seat support bar extending between respective front and rear legs and arranged for vertical movement relative to said legs substantially in the plane of a side frame member, a flexible seat carried by said seat support bars and extending transversely of said bars, a pair of X-brace members extending diagonally and transversely of said side frame members, said brace members being pivotally connected at their upper ends to opposite seat support bars and at their lower ends to opposite lower members of said side frame members, an arm pivotally connected at one end to each rear leg and carrying at its distal end wheel mounting means, a wheel and axle assembly carried by said wheel mounting means, a control link pivotally connected to said seat support bar and to said arm, the upward movement of said seat support bar effecting concurrent movement of said side frame members towards each other and swinging movement of said wheels in arcuate paths in a forward direction to position the wheels substantially within the boundries of the side frame members whereby a substantial reduction in the width and length of the chair is accomplished.

2. The invention as defined in claim 1 including a stop member mounted on each of said rear legs and adapted to be abutted by respective wheel mounting means when the chair is in extended operative condition.

3. The invention as defined in claim 1 in which each rear leg functions as a stop for limiting the movement of the wheel and axle assembly in a rearward direction.

4. The invention as defined in claim 1 including a back frame pivotally connected to the side frame members and adapted to be folded downwardly.

5. The invention as defined in claim 1 including a pair of spaced parallel members carried on said arm and adapted to embrace a portion of said rear leg when the chair is in extended operative condition.

6. The invention as defined in claim 1 including a pair of spaced parallel extensions carried by the arm and arranged to embrace a portion of a side frame member to inhibit side sway when the chair is in operative condition.

7. The invention as defined in claim 1 in which each arm includes a pair of spaced parallel extensions adapted to embrace opposite sides of each seat support bar to inhibit lateral sway when the chair is in operative position.

8. The invention as defined in claim 1 in which the arm includes a pair of spaced parallel extensions adapted to embrace opposite sides of a rear leg when the chair is in operative condition.

9. A foldable wheelchair comprising a pair of independent side frame members each including front and rear legs and horizontal upper and lower members connecting said front and rear legs, a seat support bar extending between respective front and rear legs and arranged for vertical movement relative to said legs in the plane of a side frame member, a flexible seat carried by said seat support bars and extending transversely of said bars, a pair of X-brace members extending diagonally and transversely of said side frame members, said brace members being pivotally connected at their upper ends to opposite seat support bars and at their lower ends to opposite lower side frame members, an arm pivotally connected at one end to each support bar and carrying at its distal end wheel mounting means, and a control link pivotally connected to a lower portion of a side frame member and to said arm, the upward movement of said support bars effecting concurrent movement of said side frame members toward each other and swinging movement of said wheels in arcuate paths in a forward direction to position the wheels substantially within the boundries of said side frame members whereby a substantial reduction in the width and length of the chair is accomplished.

10. The invention as defined in claim 9 including an abutment bracket mounted on each rear leg and engaged by the wheel mounting means when the chair is in operative condition.

11. A foldable wheelchair comprising a pair of independent side frame members each including front and rear legs and horizontal upper and lower members connecting said front and rear legs, a seat support bar extending between respective front and rear legs and arranged for vertical movement relative to said legs within the plane of a side frame member, a flexible seat carried by said seat support bars and extending transversely of said bars, a pair of X-brace members extending diagonally and transversely of said side frame members, said brace members being pivotally connected at their upper ends to opposite seat support bars and at their lower ends to opposite lower members, articulated link means pivotally connected to each seat support bar and to a portion of a side frame member and carrying a wheel mounting means, a wheel and axle assembly carried by each of said wheel mounting means, the upward movement of said support bars effecting concurrent movement of said side frame members toward each other and swinging movement of said wheels in arcuate paths in a forward direction to position the wheels substantially within the boundries of the side frame members whereby a substantial reduction in the width and length of the chair is accomplished.

12. The invention as defined in claim 11 in which each rear leg includes an inclined portion adapted to be abutted by a link of said articulated link means so as to fix the position of the wheel when the chair is in extended operative condition.

13. The invention as defined in claim 11 including a back frame pivotally connected to the side frame members and adapted to be folded downwardly.

* * * * *